Oct. 2, 1928.

H. H. LYON 1,686,019

ELECTRICAL MEASURING INSTRUMENT

Filed Dec. 10, 1919

WITNESSES:

INVENTOR
Henry H. Lyon.
BY
ATTORNEY

Patented Oct. 2, 1928.

1,686,019

UNITED STATES PATENT OFFICE.

HENRY H. LYON, OF BUFFALO, NEW YORK; HENRY L. LYON ADMINISTRATOR OF SAID HENRY H. LYON, DECEASED.

ELECTRICAL MEASURING INSTRUMENT.

Application filed December 10, 1919. Serial No. 343,836.

My invention relates to electrical measuring instruments and particularly to maximum-demand volt-ampere-hour meters.

One object of my invention is to provide a meter that shall indicate the maximum periodic demand of the true and the apparent energy traversing a circuit.

Another object of my invention is to provide a meter, of the above indicated character, that shall indicate the total energy consumed.

Another object of my invention is to provide a meter, of the above indicated character that shall be simple in construction and reliable in operation.

In practicing my invention, I provide two standard watt-hour-meter elements, of which one element is connected to measure the active component or true energy that traverses a circuit and the other element is connected to measure the reactive component of that energy. The indicating mechanism comprises two devices that are actuated in accordance with the values of the respective components of the energy and in directions disposed at right angles with respect to each other. A connecting bar that is disposed between the two actuating devices is calibrated to indicate the distance between them. The distance between the two devices corresponds to the apparent energy. The mechanism is periodically reset to operate during predetermined successive intervals.

Figure 1:
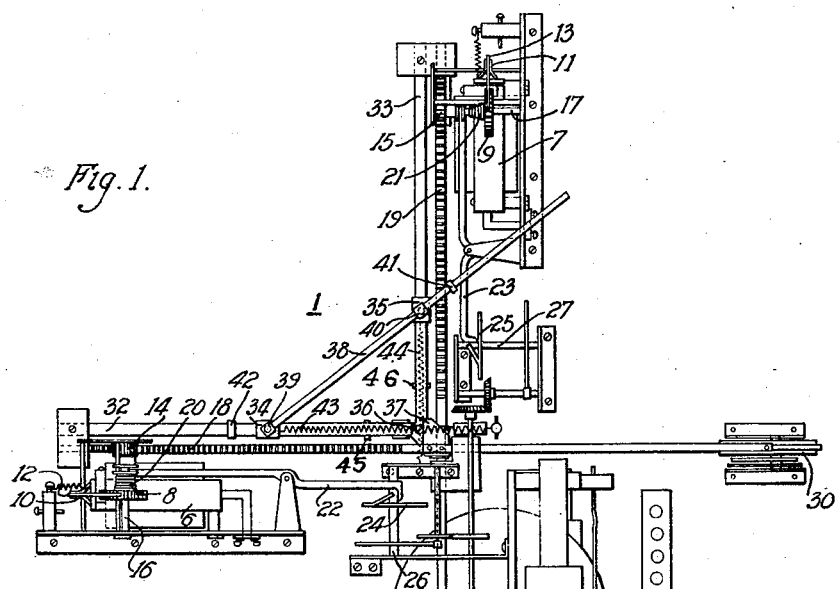
Figure 3:
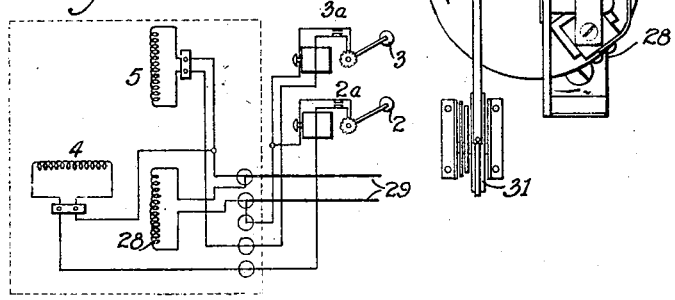
Figure 2:
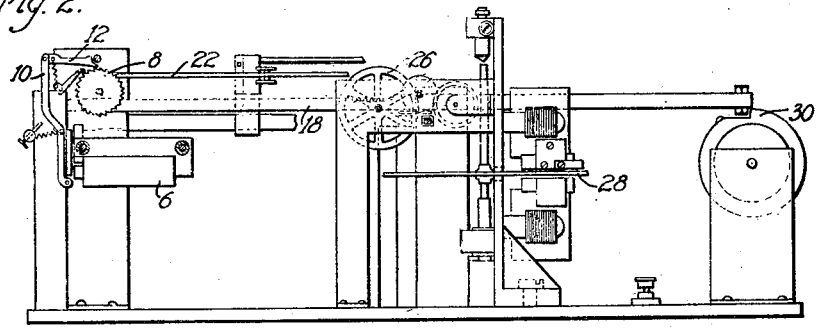

Figure 1 of the accompanying drawings is a top plan view of the indicating mechanism in an instrument embodying my invention; Fig. 2 is a side elevational view of the mechanism shown in Fig. 1; and Fig. 3 is a diagrammatic view of the arrangement of the energizing circuits of the instrument shown in Figs. 1 and 2.

An instrument for measuring and indicating the maximum periodic demand of the true and the apparent energy traversing a circuit comprises an indicating mechanism 1 and a plurality of measuring devices 2 and 3 for measuring the active and the reactive components of the energy. Contact members 2a and 3a are disposed in the gear trains of the measuring devices 2 and 3 and are adapted to complete circuits for energizing the coils 4 and 5 of the electromagnets 6 and 7, respectively. The electromagnets 6 and 7 actuate ratchet wheels 8 and 9 through armatures 10 and 11 and dogs 12 and 13, respectively.

Pinions 14 and 15 are mounted on shafts 16 and 17 upon which the ratchet wheels 8 and 9 are also mounted, and engage toothed racks 18 and 19, respectively. Springs 20 and 21 are disposed on the shafts 16 and 17 between the pinions 14 and 15 and the ratchet wheels 8 and 9. Lever arms 22 and 23 are adapted, when actuated by cam members 24 and 25, respectively, to disengage the pinions 14 and 15 from the racks 18 and 19, at the end of a predetermined interval of time, to permit the indicating mechanism 1 to be reset, after which the springs 20 and 21 effect re-engagement of the pinions 14 and 15 and the racks 18 and 19, respectively. The cam members 24 and 25 are actuated, through gear trains 26 and 27, by a constant-speed device 28 that is energized from a circuit 29. Two springs 30 and 31 are adapted to return the toothed racks 18 and 19 to their initial positions when the pinions 14 and 15 become disengaged therefrom, at the end of the succesive predetermined intervals of time.

Two guide bars 32 and 33 are fixedly mounted at right angles with respect to each other, and parallel to the toothed racks 18 and 19. Sliding blocks 34 and 35 are mounted on the guide bars 32 and 33 and are adapted to be moved thereon by lateral projections 36 and 37 on the toothed racks 18 and 19. A connecting bar 38 is fixedly mounted in a swivel member 39 on the sliding block 34 and is slidably mounted in a swivel member 40 on the sliding block 35, and has an indicating block 41 mounted thereon. A similar indicating block 42 is mounted on the guide bar 32. Two springs 43 and 44 are adapted to return the sliding blocks 34 and 35 to their initial positions when the toothed racks 18 and 19 are returned by the springs 30 and 31.

The two watt-hour-measuring instruments 2 and 3 are adapted to measure the active and the reactive components, respectively, of the apparent energy to be metered. A set of contact members 2a and 3a is so disposed in the gear trains of each element, that engagement is effected, momentarily, after the disc of the meter element has rotated a predetermined number of times. Engagement of the contact members 2a completes the circuit for energizing the coil 4 of the electromagnet 6. The ratchet wheel 8 is thereupon actuated by the armature 10 and the dog 12. The pinion 14, being coaxially mounted with the ratchet wheel 8, turns therewith and moves the toothed rack 18 a distance proportional to the movement of the ratchet wheel 8. The meter element 2 that measures the active component of the energy, causes the electromagnet 6 to be energized each time its disc rotates a predetermined number of times. The ratchet wheel 8 and, consequently, the rack 18 are moved, therefore, a distance that is proportional to the true energy traversing the circuit that is to be metered. Similarly, the rack 19 is moved in accordance with the reactive component of that energy.

The sliding blocks 34 and 35 are moved along the guide rods 32 and 33 by the lateral projections 36 and 37 that are secured to the toothed racks 18 and 19. The block 34 is moved in accordance with the true energy that traverses the circuit in a predetermined interval of time and the block 35 is moved in accordance with the reactive component of the energy.

The connecting bar 38 is so mounted in the swivels 39 and 40 on the sliding blocks 34 and 35 that it substantially constitutes the hypothenuse of the right triangle formed by the movements of the sliding blocks 34 and 35. The distance between predetermined points on the sliding blocks 34 and 35, is therefore, proportional to the volt-ampere hours or apparent energy that traverses the circuit.

The indicating block 42 is moved along the guide bar 32 by the sliding block 34 and is, therefore, adapted to indicate, on the guide bar 32, the maximum periodic demand of the true energy that traverses the circuit during any predetermined interval of time. Similarly, the indicating block 41 is moved along the connecting bar 38, which is graduated, and is adapted to indicate thereon, the maximum periodic demand of the apparent energy that traverses the circuit during any predetermined interval of time.

The length of the periodic intervals of time is fixed by means of the constant-speed device 28 and the associated gear trains 26 and 27. The cam members 24 and 25 are adapted to permit the indicating mechanism to be reset at the end of each predetermined interval of time by so actuating the lever arms 22 and 23 as to disengage the pinions 14 and 15 from the toothed racks 18 and 19. The toothed racks 18 and 19, being no longer held by the pinions 14 and 15, are returned to their initial positions by the springs 30 and 31, and the sliding blocks 34 and 35 are returned by the springs 43 and 44. The lever arms 22 and 23 are now released by the cam members 24 and 25, and the springs 20 and 21 effect re-engagement of the pinions 14 and 15 and the toothed racks 18 and 19. The indicating blocks 41 and 42 remain in their maximum positions to indicate the maximum periodic demand of the true and of the apparent energy over any interval of time.

The mechanism is illustrated in Fig. 1 as at the end of a predetermined interval of time, but with the sliding blocks 34 and 35 and the connecting bar 38 still in operative-indicating position. The racks 18 and 19 are illustrated as having been returned to their respective initial positions and the blocks 34 and 35 would normally be resting against the stop members 45 and 46. The bar 38 has been shown in its present position, however, to illustrate its disposition after the operation of the mechanism during a predetermined interval.

Although I have shown a structure embodying my invention, I do not wish to be limited thereto, as various modifications may be made therein without departing from the spirit and scope of my invention as set forth in the appended claims.

I claim as my invention:

1. In a measuring instrument, the combination with two meters, members driven thereby disposed at substantially right angles with respect to each other, and means for connecting the said driven members, of means for periodically resetting the driven members independently of the meters, and means for indicating on the connecting means the maximum distance between the driven members.

2. In an apparent-power-measuring instrument, the combination with two meters, members driven thereby disposed at substantially right angles with respect to each other and actuated in accordance with the active and the reactive components, respectively, of the energy traversing an electrical circuit, and means for connecting the driven members, of means for periodically resetting the driven members independently of the meters, means for indicating the maximum demand of apparent energy on the connecting means, and means associated with the driven member that is actuated in accordance with the active component of the energy for indicating the maximum demand of true energy.

3. In an apparent-power-measuring instrument the combination with two meter elements adapted to measure the active and the reactive components, respectively, of the energy traversing an electrical circuit, and two toothed racks adapted to be actuated in accordance therewith, in horizontal directions, substantially at right angles with respect to each other, of stationary guide bars paralleling the toothed racks, sliding block members mounted on the guide bars and adapted to be moved thereon in accordance with the movements of the toothed racks, means connecting the sliding blocks and adapted to move in accordance with the apparent-energy demand, means for periodically resetting the toothed racks and the sliding blocks, and means for indicating on the connecting means the maximum periodic demand of apparent energy.

4. In a measuring instrument, the combination with two driven members and means for actuating the driven members in accordance with the respective components of the energy traversing an electrical circuit, of means for periodically disengaging and resetting the driven members independently of the actuating means, means for connecting the driven members, and means associated with the connecting means for indicating thereon the maximum distance between the driven members.

5. In an electrical measuring instrument the combination with two driven members disposed at substantially right angles with respect to each other, and a driving means, of two meter elements adapted to control the movements of the driven members in accordance with the active and the reactive components of the energy traversing a circuit, means for periodically resetting the driven members, means so connecting the driven members as to constitute the hypothenuse of the right triangle formed thereby and so actuated as to be adapted to move in accordance with the maximum demand of apparent energy, and means for indicating on the connecting means the value of the maximum periodic apparent-energy demand.

6. In an apparent-energy measuring instrument the combination with two meter elements and two sets of contact members engagement of which is effected by said meter elements, of two electromagnets adapted to become energized through the circuits completed by the contact members, coaxially mounted pinions and ratchet wheels adapted to be actuated by the electromagnets, two toothed racks adapted to be actuated by the pinions in directions substantially at right angles with each other in accordance with the separate components of the energy traversing a circuit during successive predetermined intervals of time, two stationary guide bars mounted parallel to the toothed racks, sliding blocks mounted on the bars, and adapted to be moved thereon by the toothed racks, a sliding bar mounted between swivels on the sliding blocks, indicating blocks slidably mounted on the sliding bar and on one guide bar for indicating thereon the maximum apparent and the maximum true energy traversing the circuit during the time intervals, and means for periodically disengaging the pinions and the toothed racks at the end of the time intervals to permit the instrument to be reset for the following interval of time.

7. In an electrical measuring instrument, the combination with a watt-hour meter for registering the true energy consumed in a circuit and a watt-hour meter for registering the reactive component of that energy, of a toothed rack adapted to be actuated in accordance with the energy consumed in successive predetermined intervals of time and a toothed rack adapted to be actuated in accordance with such reactive component of the energy, two stationary bars mounted parallel to the toothed racks and disposed substantially at right angles with respect to each other, a block member slidably mounted on each bar and adapted to be actuated thereon in accordance with the movement of the parallel rack, a bar member slidably mounted between the block members, an indicating block slidably mounted thereon and adapted to indicate thereon the maximum demand of apparent energy, and means for so resetting the mechanism comprising the block members and the bar member disposed therebetween that it may operate during the following interval of time.

8. In an apparent-energy measuring instrument, the combination with a driving member, two driven members disposed substantially at right angles with respect to each other, and means for controlling the operation of the driven members in accordance with two components of the energy traversing a circuit, of guide bars disposed in parallel relation to the driven members, sliding blocks so mounted thereon as to be actuated by the driven members, a connecting bar mounted between the sliding blocks, means for resetting the sliding blocks and the connecting bar, and indicating blocks, mounted on the connecting bar and on one guide bar for indicating the maximum values of the apparent and true energy demand.

9. In an apparent-energy measuring instrument, the combination with a driving member, two driven members disposed substantially at right angles with respect to each other, ratchet wheels and pinions coaxially mounted for controlling the operation of the driven members, of an electromagnet and a pawl member associated therewith for actuating the ratchet wheel, means for periodically disengaging the driving and the driven members, guide bars disposed in parallel relation to the driven members, sliding blocks so mounted thereon as to be actuated by the driven members, a connecting bar mounted between the sliding blocks, and indicating blocks mounted on the connecting bar and on a guide bar for indicating, respectively, the maximum distance between the sliding blocks and the distance traversed by one sliding block.

10. In an apparent-energy measuring instrument, the combination with a driving member, two driven members disposed substantially at right angles with respect to each other, two meter elements, and two electromagnets energized thereby, of two ratchet wheels and pinions coaxially mounted and adapted to control the operation of the driven members in accordance with the two components of the energy traversing a circuit as measured by the meter elements, means for periodically disengaging the pinions and the driven members, means associated with the driven members for indicating the values of the two components, and means associated with said component-indicating means for indicating maximum values of the true and the apparent energy traversing the circuit.

11. In a measuring instrument, the combination with two driven members disposed at right angles to each other and means for connecting the same, of means for periodically resetting the driven members and means associated with the connecting means for indicating the maximum distance between the driven members attained in any period.

12. In a measuring instrument, the combination with two reciprocating members moving at right angles to each other and means for actuating the same in accordance with the active and reactive components of energy traversing a circuit, of means for periodically resetting said reciprocating members, and means including said members for indicating the maximum volt-ampere-hour demand.

13. The combination with means actuated in accordance with the active and reactive components of apparent energy traversing a circuit, respectively, of register means jointly controlled thereby, driving means including a gear between each component means and said register means, and means for demeshing said gears and resetting said register means.

In testimony whereof, I have hereunto subscribed my name this 25th day of November, 1919.

HENRY H. LYON.